(12) United States Patent
Yoshida et al.

(10) Patent No.: US 6,963,474 B2
(45) Date of Patent: Nov. 8, 2005

(54) THIN FILM MAGNETIC HEAD, MAGNETIC HEAD AND MAGNETIC DISK DRIVING DEVICE

(75) Inventors: Makoto Yoshida, Chuo-Ku (JP); Taro Oike, Chuo-Ku (JP); Noboru Yamanaka, Chuo-Ku (JP)

(73) Assignee: TDK Corporation, Tokyo (JP)

( * ) Notice: Subject to any disclaimer, the term of this patent is extended or adjusted under 35 U.S.C. 154(b) by 250 days.

(21) Appl. No.: 10/026,877

(22) Filed: Dec. 27, 2001

(65) Prior Publication Data

US 2002/0093772 A1    Jul. 18, 2002

(30) Foreign Application Priority Data

Jan. 16, 2001 (JP) .............................. 2001-008315

(51) Int. Cl.[7] .............................................. G11B 5/39
(52) U.S. Cl. ...................................................... 360/317
(58) Field of Search .............................. 360/313, 317, 360/123, 125, 126

(56) References Cited

U.S. PATENT DOCUMENTS

| | | | |
|---|---|---|---|
| 6,144,533 A | * 11/2000 | Fukuda et al. | 360/313 |
| 6,349,014 B1 | * 2/2002 | Crue et al. | 360/123 |
| 6,381,094 B1 | * 4/2002 | Gill | 360/126 |
| 6,396,660 B1 | * 5/2002 | Jensen et al. | 360/126 |
| 2002/0067571 A1 | * 6/2002 | Yoshida et al. | 360/126 |
| 2003/0021065 A1 | * 1/2003 | Yamada et al. | 360/126 |

FOREIGN PATENT DOCUMENTS

| | | | |
|---|---|---|---|
| JP | 62-128011 | * | 6/1987 |
| JP | 3-84705 | * | 4/1991 |
| JP | 3-162705 | * | 7/1991 |
| JP | 3-268210 | * | 11/1991 |
| JP | 4-79007 | * | 3/1992 |
| JP | A 4366408 | | 12/1992 |
| JP | 6-84507 | | 2/1994 |
| JP | 2000-276806 | * | 10/2000 |

* cited by examiner

*Primary Examiner*—Angel Castro
(74) *Attorney, Agent, or Firm*—Oliff & Berridge, PLC (57) ABSTRACT

A thin film magnetic head includes a slider, at least one inductive type electromagnetic conversion element and a thermal diffusion film. The inductive type electromagnetic conversion element includes a first magnetic film, a second magnetic film, a gap film, a coil film and an insulating film which are supported by the slider. The coil film is embedded in the insulating film. The thermal diffusion film is made of a metallic film, and disposed in the heat transmission path from the coil film toward the slider.

16 Claims, 13 Drawing Sheets

THIN FILM MAGNETIC HEAD, MAGNETIC HEAD AND MAGNETIC DISK DRIVING DEVICE

BACKGROUND OF THE INVENTION

1. Field of the Invention

This invention relates to a thin film magnetic head, a magnetic head device and a magnetic disk driving device.

2. Related Art Statement

A floating type thin film magnetic head includes usually a writing element constructed of an inductive type electromagnetic conversion element and a reading element constructed of a magnetoresistive effective element. The inductive type electromagnetic conversion element is covered with a protection film which is made of an inorganic insulating material such as alumina and constitutes an outermost surface layer of the magnetic head in the air outflow side.

The inductive type electromagnetic conversion element includes a first and a second magnetic films, a gap film, a coil film and an insulating film, etc. The edge portions of the first and second magnetic films, which are opposed each other via the gap film in the air bearing surface (hereinafter, called as "ABS") of the slider, constitutes a pole portion for writing.

Moreover, the second magnetic film rises up with inclination of a given angle on the gap film, extending backward from the ABS with maintaining a minute space for the first magnetic film, and is joined with the first magnetic film.

The coil film passes through the space (inner gap) in between the first and the second magnetic films and winds spirally around a backward joined portion between the first and the second magnetic films. Both ends of the coil film are drawn out to the outside via a terminal conductor bump. The inner gap in between the first and the second magnetic films is filled by the insulating film. The coil film is embedded in the insulating film. The second magnetic film is formed on the insulating film.

In writing for a magnetic disk by the above thin film magnetic head, an electric current for writing is supplied to the coil film of the inductive type electromagnetic conversion element.

In this case, however, the coil film develop a heat. As mentioned above, since the coil film is embedded in the insulating film made of an organic insulating material, and the insulating film is covered with the protection film made of alumina, etc., the coil film can not radiate the heat effectively. Therefore, the developed heat is stored in the thin film magnetic head, and thus, expands the insulating film thermally.

The thermally expanded insulating film presses and expands the protection film to the outside. The expansion of the protection film influences the ABS, resulting in the expansion of the inductive type electromagnetic conversion element in the ABS. Moreover, the developed heat in the coil film expands the first and the second magnetic films adjacent to the insulating film thermally. As a result, the edge of the pole portion, not much strongly fixed, composed of the first and the second magnetic films is expanded in the ABS side. The expansion degree often reaches 10 nm.

In a magnetic disk driving device having such a thin film magnetic head, for high recording density, the floating space between the ABS of the thin film magnetic head and a magnetic disk is narrowed gradually to 40 nm, 30 nm, 20 nm or 10 nm. Therefore, the above expansion in the ABS can easily crash the thin film magnetic head itself and the magnetic disk or damage the magnetic recorded data, resulting in the deterioration of the reliability of the magnetic disk driving device.

For resolving the problem, Japanese Laid-open Patent Publication Kokai Hei 4-366408 (JP A 4-366408) discloses that a recessed portion is formed on the surface of a protection film made of an inorganic material in a medium opposing surface. The recessed portion is so formed that the surface of the protection film is polished flat with heating the thin film magnetic head element and thereby, expanding the protection film.

However, the disclosed technique dose not repress the thermal expansion of the protection film, but allows the thermal expansion as far as the protection film does not expands beyond the flat ABS by retreating the protection film from the ABS in advance. Therefore, the disclosed technique can not solve the above problem.

Moreover, in the above technique, the complicate process is required that the protection film is flattened on the basis of the assumed expansion degree due to the developed heat at a recording operation. In addition, the configuration of the slider, particularly the geometrical shape of the ABS is specified to a give shape, and thus, the ABS can not have another geometrical shape for improving the floating performance. Then, in the above technique, a means to repress the thermal expansion of the edge of the pole portion is not disclosed.

SUMMARY OF THE INVENTION

It is an object of the present invention to provide a thin film magnetic head in which the thermal expansion in the ABS due to the developed heat at a recording operation can be repressed, and thus, the head crash and the damage for a magnetic disk and magnetically recorded data can be inhibited.

For achieving the above objects, a thin film magnetic head according to the present invention includes a slider, at least one inductive type electromagnetic conversion element and a thermal diffusion film.

The inductive type electromagnetic conversion element includes a first magnetic film, a second magnetic film, a gap film, a coil film and an insulating film which are supported by the slider. The forefronts of the first and the second magnetic films are opposed via the gap film in the air bearing surface side of the slider, and thereby, constitutes a pole portion.

The first magnetic film is extended backward from the pole portion on the basis of the air bearing surface, and the second magnetic film is extended backward from the pole portion with keeping a given space for the first magnetic film and joined with the first magnetic film at a backward joining portion. The coil film is embedded in the insulating film and wound spirally around the backward joined portion.

The thermal diffusion film is made of a metallic film, and disposed in the heat transmission path from the coil film toward the slider.

As mentioned above, in the thin film magnetic head of the present invention, the edge portions in the ABS of the first magnetic film and the second magnetic film constituting the inductive type electromagnetic conversion element are opposed each other via the gap film, and constitutes the pole portion for writing. The second magnetic film is extended backward from the ABS, and joined with the second magnetic portion at the backward joining portion, to complete a thin film magnetic circuit including the writing pole portion in the ABS.

The second magnetic film is extended backward from the ABS with keeping a given space for the first magnetic film. The coil film is extended in between the first and the second magnetic films, and wounded up around spirally around the backward joining portion. Therefore, when a given electric current for writing is flown in the coil film, a magnetic flux for writing is created through the magnetic circuit, and then, is supplied to the pole portion, to magnetically record a given data in a magnetic disk.

Since the coil film is embedded in the insulating film, and the second magnetic film is provided on the insulating film, the coil film is insulated electrically against the first magnetic film and the second magnetic film, which is a fundamental electrical structure.

The insulating film is normally made of an organic insulating material, and the coil film is embedded in the insulating film. In addition, the inductive type electromagnetic conversion element assembly including the coil film, the first and the second magnetic films or the like is covered with the protection film made of alumina or the like. Therefore, in the past, the developed heat (Joule heat) in the coil film can not be radiated sufficiently, and stored. As a result, the insulating film in which the coil film is embedded is thermally expanded, and thus, the first and the second magnetic films which are adjacent to the coil film are thermally expanded, to thermally expand in the ABS side the edge of the pole portion, not much strongly fixed, composed of the first and the second magnetic films, and thus, crash the magnetic head and magnetic disk and damage magnetically recorded data. Accordingly, the reliability of the magnetic disk driving device is largely deteriorated.

In this point of view, it is required that the thin film magnetic head of the present invention includes a thermal diffusion film made of a metallic material in the heat transmission path from the coil film to the slider.

Therefore, even though the inductive type electromagnetic conversion element assembly is covered with the protection film, the developed heat in the coil film can be radiated outside from the slider through the thermal diffusion film.

Generally, the protection film is formed so thinner that the maximum thickness is about 30 $\mu$m, so the volume and thus, the heat capacity is very small. Therefore, the protection film is thermally saturated at once by the developed heat in the coil film, and thus, can not radiate the heat from the coil film.

On the other hand, the volume, and thus, the heat capacity of the slider is very large as compared with the ones of the protection film, so that a large and sharp thermal gradient in between the coil film and the slider is created.

In this invention, as mentioned above, the thermal diffusion film is provided in the heat transmission path from the coil film to the slider. Therefore, the developed heat in the coil film is transmitted to the slider and thus, can be radiated effectively by taking advantage of the thermal gradient.

Moreover, since the thermal diffusion film is made of a metallic film, it can be also discriminated from the other constituent elements made of organic materials or inorganic materials.

As mentioned above, according to the present invention, the heat developed in the coil film from the electric current for writing can be radiated to the slider through the thermal diffusion film and then, radiated outside from the slider. Therefore, the thermal expansion in the insulating film, the first and the second magnetic films can be inhibited, and thus, the head crash, the damage for a magnetic disk and a magnetically recorded data can be inhibited even though the floating space is minimalized.

In a preferred embodiment of the present invention, the thermal diffusion film is provided so as to be continued from the coil film and to be expanded outside from the coil film. In this case, the heat developed in the coil film can be transmitted directly to the thermal diffusion film in the same surface level. In the coil film, the constructional properties such as the line width, the pitch, and the winding number are strictly required, but in the thermal diffusion film, such constructional properties are not strictly required. Therefore, the area of the thermal diffusion film can be enlarged within a physically allowable range. As a result, the thermal diffusion film can have a large heat capacity, and thus, absorb the heat developed in the coil film effectively. Moreover, since a large and sharp thermal gradient is created in between the coil film and the slider, the absorbed heat can be transmitted to the slider effectively.

In another preferred embodiment of the present invention, the thermal diffusion film may be provided in between the first magnetic film, which is disposed in the slider side, and the slider. In this case, since the thermal diffusion film, which has a large thermal conductivity, is disposed in the heat transmission path having sharp temperature gradient from the coil film toward the slider, the heat developed in the coil film can be transmitted to the slider effectively.

In still another embodiment of the present invention, the above-mentioned two embodiments are combined. That is, the thermal diffusion film includes a first thermal diffusion film and a second thermal diffusion film. The first thermal diffusion film is formed so as to be continued from the coil film and to be expanded outside from the coil film, and the second thermal diffusion film is formed in between the first magnetic film and the slider. In this case, the developed heat in the coil film can be radiated more effectively, and thus, the thermal expansion in each constituent element such as the protection film around the coil film can be inhibited more effectively. As a result, the head crash, the damage for a magnetic disk and magnetically recorded data can be inhibited more effectively.

The thin film magnetic head of the present invention may include at least one magnetoresistive effective element as a reading element. The magnetoresistive effective element may be constructed of an element having a spin valve film structure, a ferromagnetic tunnel junction effective element or a giant magnetoresistive effective element including a perovskite type magnetic substance.

This invention also relates to a magnetic head device and a magnetic disk device which include the above-mentioned thin film magnetic head.

The other objects, configurations and advantages will be explained in detail, with reference to the attaching drawings in embodiments.

BRIEF DESCRIPTION OF THE DRAWINGS

For a better understanding of this invention, reference is made to the attached drawings, wherein.

DETAILED DESCRIPTION OF PREFERRED EMBODIMENTS

Figure 1:
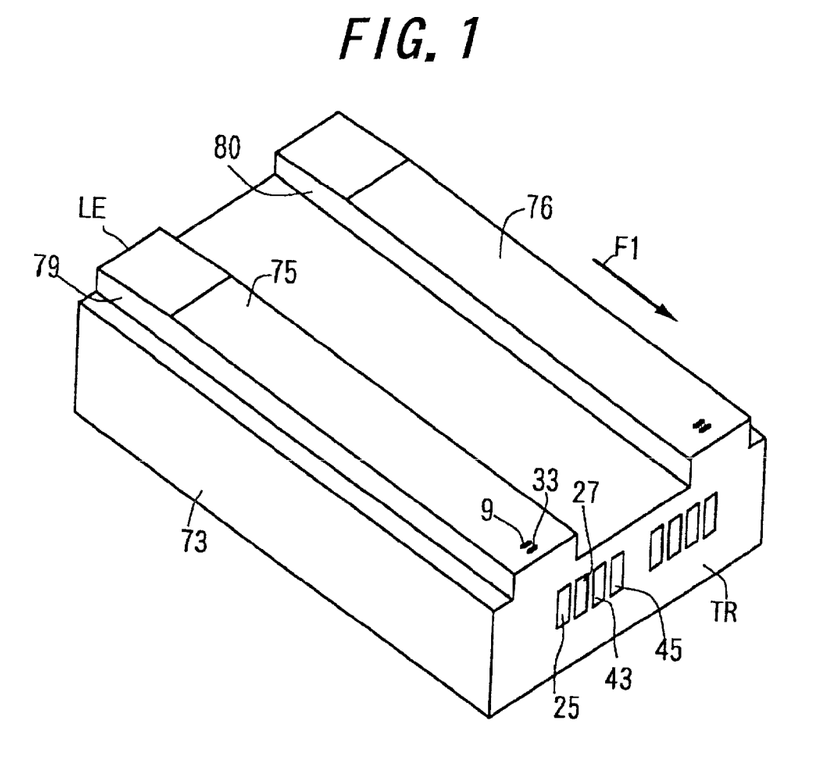
FIG. 1 is a perspective view showing a thin film magnetic head according to the present invention.
Figure 2:
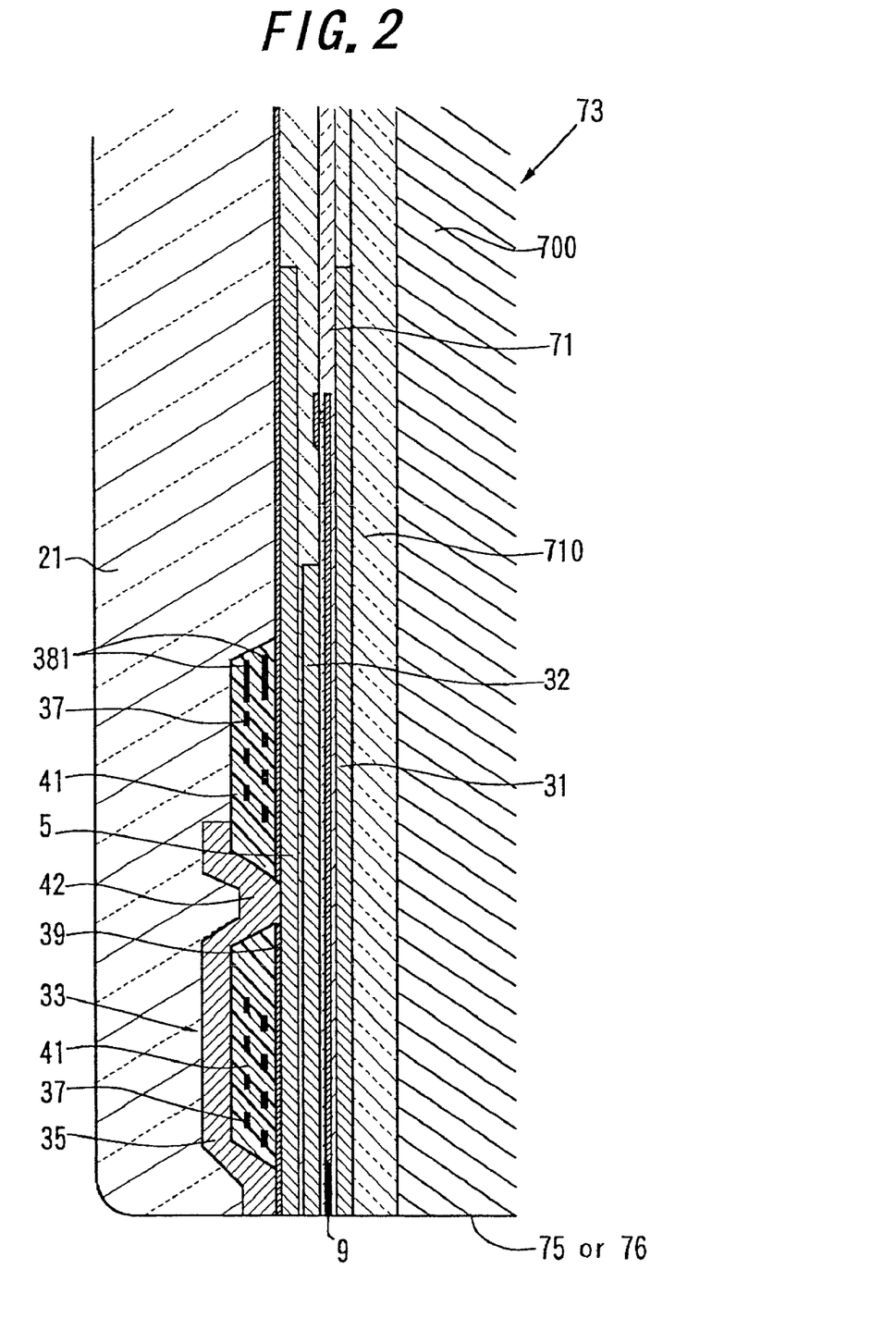
FIG. 2 is an enlarged cross sectional view showing a portion of the thin film magnetic head shown in FIG. 1.

FIG. 1 is a perspective view showing a thin film magnetic head according to the present invention, and FIG. 2 is an enlarged cross sectional view of a portion of the thin film magnetic head shown in FIG. 1. In these figures, some constituent elements are depicted exaggeratedly.

The illustrated thin film magnetic head includes a slider 73, two inductive type electromagnetic conversion elements 33 and two magnetoresistive effective elements 9 (hereinafter, called as "MR element"s). The slider 73 has rail parts 79 and 80 on its medium opposing surface, and the surfaces of the rail parts 79 and 80 are employed as ABSs 75 and 76. The slider 73 is not always required to have the two rail parts 79 and 80. For example, it may have one to three rail parts or a flat surface without the rail. For improving its floating performance, the slider 73 may have rail parts with geometrical shapes. This invention can be applied for any kind of slider. The slider 73 may have a protection film with a thickness of 8–10 nm made of DLC on the rail parts, and in this case, the ABSs 75 and 76 are composed of the surface of the protection film. The slider 73 is a ceramic structural body which is composed of a base 700 made of $Al_2O_3$—TiC or the like and an inorganic insulating film 710 made of $Al_2O_3$, $SiO_2$ or the like on the base 700.

The inductive type electromagnetic conversion element 33 functions as a writing element, and the MR element 9 functions as a reading element. The inductive type electromagnetic conversion elements 33 and the MR elements 9 are provided on both of the end surfaces of the rail parts 79 and 80 in an air outflow edge (trailing edge) TR. However, the inductive type electromagnetic conversion elements and the MR elements may be provided on either end surface of the rail part 79 or 80. The edge portions for electromagnetic conversion of the inductive type electromagnetic conversion elements 33 and the MR elements 9 which are provided on the rail parts 79 and 80 constituting the slider 1 are located near the ABSs 75 and 76. On the end surface of the thin film magnetic head in the air outflow edge TR are provided pull-out electrodes 43 and 45 connected to the inductive type electromagnetic conversion elements 33 and pull-out electrodes 25 and 27 connected to the MR elements 9, respectively.

The inductive type electromagnetic conversion element 33 has a first magnetic film 5, a second magnetic film 35, a coil film 37, a gap film 39 made of alumina, etc., an insulating film 41 and a protection film 21.

The forefronts of the first and the second magnetic films 5 and 35 are opposed each other via the gap film 39 with a minute thickness, and thereby, constitute a pole portion for writing. The first and the second magnetic films 5 and 35 may have single layered structure or multi-layered structure. The multi-layered first and second magnetic films may improve the performance of the thin film magnetic head. In view of the narrowing of track width and the development of recording performance, various pole portion structures are proposed up to now. This invention can be applied for any kind of pole portion structure. The gap film 39 is made of an inorganic insulating material such as a non-magnetic metal or alumina.

The second magnetic film 35 rises up with inclination of a given angle θ from the gap film 39. The rising angle θ corresponds to an Apex Angle, and the distance between the forefront of the pole portion and the rising start point corresponds to a Throat Height TH. The Apex Angle θ and the Throat Height TH influence the electromagnetic conversion properties of the thin film magnetic head.

The second magnetic film 35 is extended backward from the ABSs 75 and 76 with keeping the inner gap for the first magnetic film 5, and is joined with the first magnetic film 5 at a backward joining portion 42. Thereby, a thin film magnetic circuit composed of the first and the second magnetic films 5 and 35 and the gap film 39 is completed.

The coil film 37 is located between the first and the second magnetic films 5 and 35, and is wound spirally around the backward joining portion 42. Both ends of the coil film 37 are conductively connected to the pull-out electrodes 43 and 45 (see, FIG. 1). The winding number and layer number of the coil film 37 are not limited.

The insulating film 41 is composed of an organic insulating resin film or a ceramic film such as $Al_2O_3$ or $SiO_2$, and is charged in the inner gap between the first and the second magnetic films 5 and 35. The coil film 37 is embedded in the insulating film 41. The second magnetic film 35 is provided on the insulating film 41.

The inductive type electromagnetic conversion elements 33 are entirely covered with a protection film 21 made of $Al_2O_3$, $SiO_2$ or the like.

As the MR element 9, various film structures have been proposed and practically used. For example, an anisotropic magnetoresistive (AMR) effective element made of permalloy, an element with a giant magnetoresistive (GMR) effective film structure such as a spin valve film structure or a perovskite type magnetic substance, or a tunnel junction effective element are exemplified. In this invention, any kind structure as mentioned above may be employed. The MR element 9 is disposed in an insulating film 71, made of alumina etc., provided between a first shield film 31 and a second shield film 32. The MR element 9 is connected to the pull-out electrodes 25 and 27 (see, FIG. 1). The first magnetic film 5 may double as a second shielding film. In this case, the second shielding film 32 may be omitted.

Figure 3:
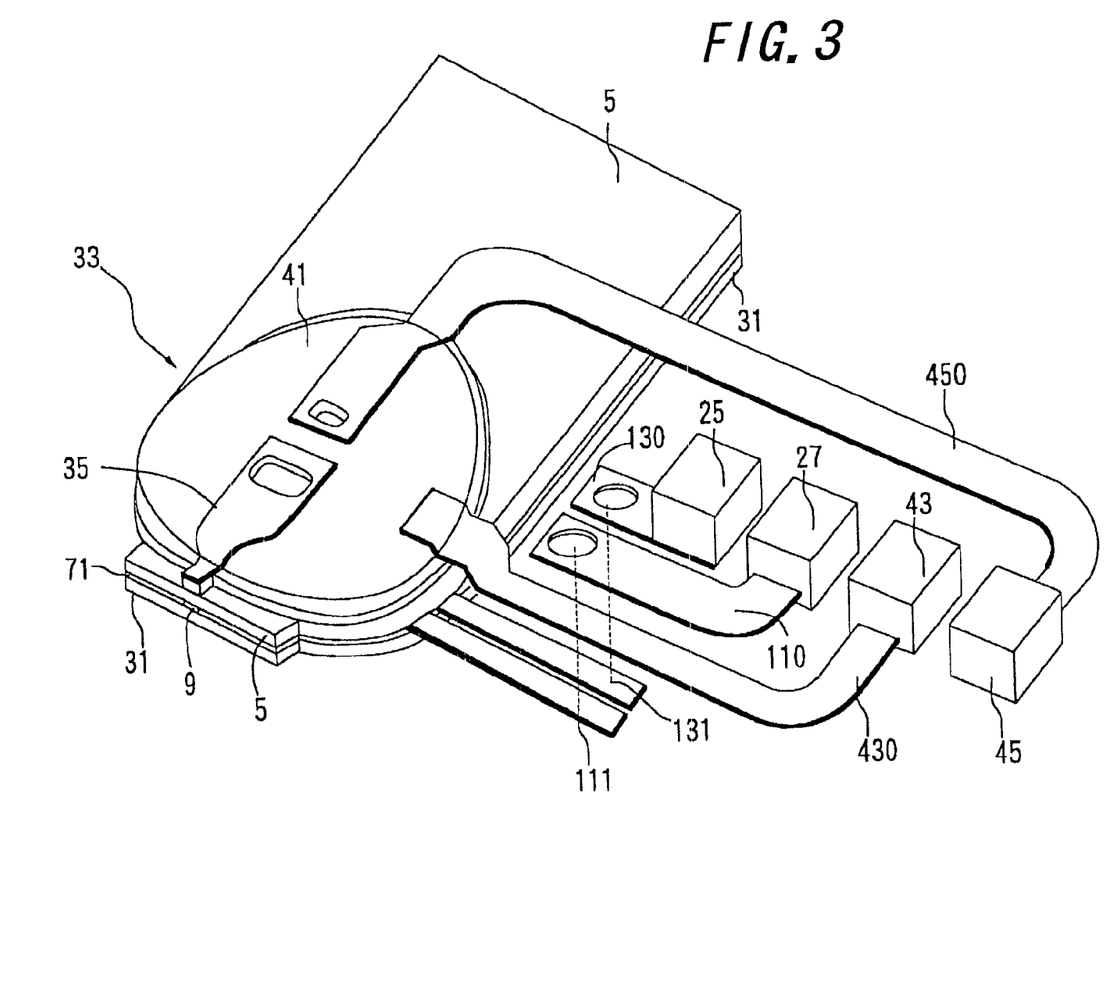
FIG. 3 is a plan view showing the electromagnetic conversion element of the thin film magnetic head.
Figure 4:
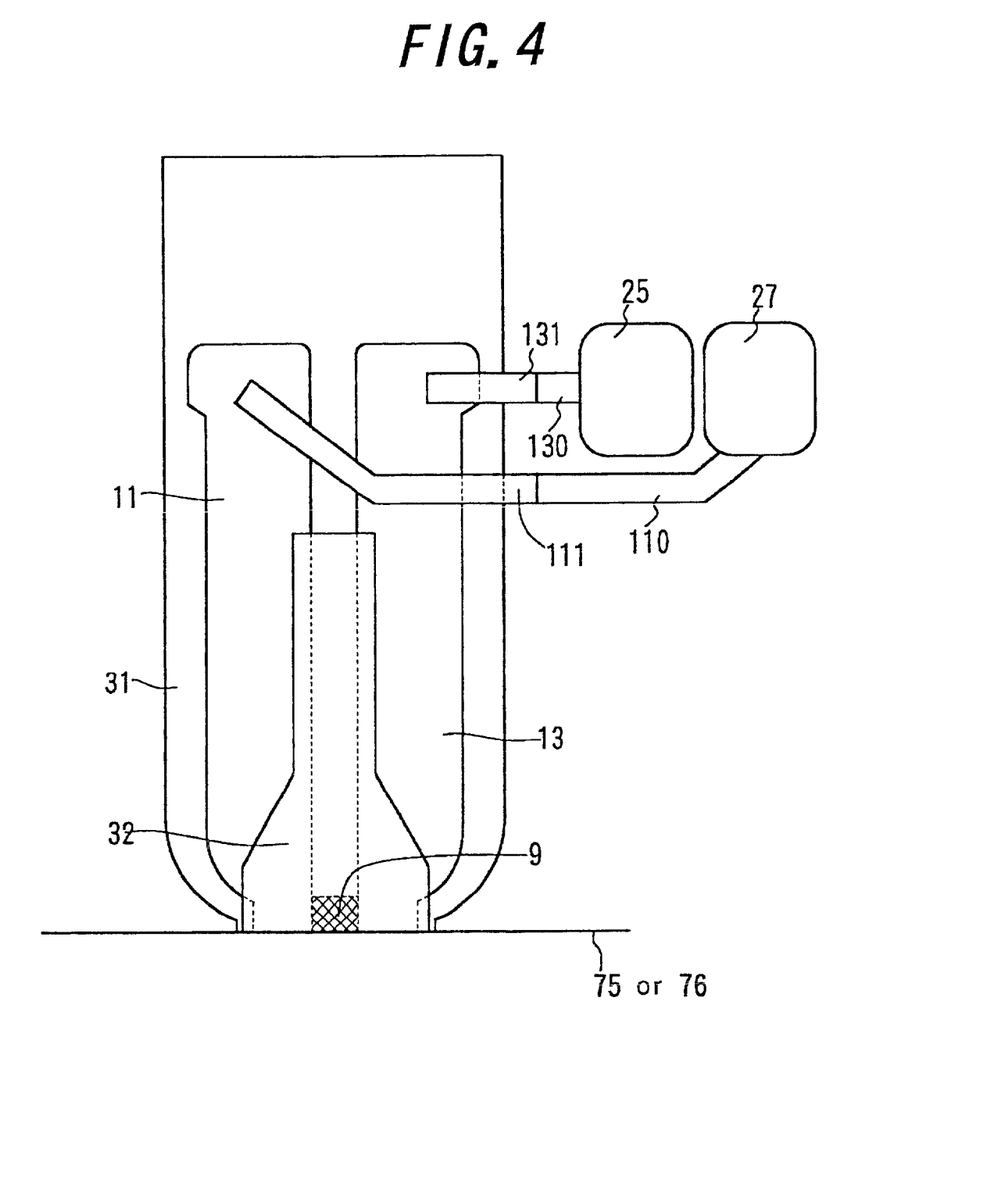
FIG. 4 is a plan view showing the electric conduction area except the inductive type electromagnetic conversion element of the electromagnetic conversion element shown in FIG. 3.

FIG. 3 is a plan view showing the electromagnetic conversion element of the thin film magnetic head shown in FIGS. 1 and 2, and FIG. 4 is a plan view showing the electric conduction area except the inductive type electromagnetic conversion element of the electromagnetic conversion element shown in FIG. 3. As is apparent from FIGS. 3 and 4, the electromagnetic conversion element includes the first shielding film 31, the insulating film 71, a first leading conductive film 11, a second leading conductive film 13 and the second shielding film 32. The first shielding film 31 is formed of a normal material such as permalloy in a normal thickness on the slider 73. The insulating film 71 is made of alumina or the like, and is disposed on the first shielding film 31.

The first and the second leading conductive films 11 and 13 are disposed in the insulating film 71, and connected to both ends of the MR element 9. The material and the film structure of the first and the second leading conductive films 11 and 13 are determined on whether the MR element 9 is made of an anisotropic magnetoresistive effective element, an element with a giant magnetoresistive (GMR) effective film structure such as a spin valve film structure or a perovskite type magnetic substance, or a tunnel junction effective element. The first leading conductive film 11 is drawn backward from the ABSs 75 and 76, and connected to a terminal conductor 27 via leading conductors 110 and 111. The second leading conductive film 13 is also drawn backward from the ABSs 75 and 76, and connected to a terminal conductor 25 via leading conductors 130 and 131.

The second shielding film 32 is disposed on the insulating film 71, and may be made of a similar material in a similar thickness to the ones of the first shielding film 31.

In the inductive type electromagnetic conversion element of the thin film magnetic head, as mentioned above, the forefronts of the first and the second magnetic films 5 and 35 in the ABSs 75 and 76 of the slider 73 are opposed each other via the gap film 39, and thus, constitute the pole portion. The second magnetic film 35 is extended backward from the ABSs 75 and 76, and joined with the first magnetic film 5 at the backward joining portion 42, to complete a thin film magnetic circuit having the pole portion for writing at the ABSs 75 and 76.

Also, the second magnetic film 35 is extended backward from the ABSs 75 and 76 with keeping the inner gap for the first magnetic film 5. The coil film 37 is passed through the inner gap between the first and the second magnetic films 5 and 35, and wound spirally around the backward joining portion 42. Therefore, when an electric current for writing is flown in the coil film 37, a magnetic flux for writing is created through the thin film magnetic circuit composed of the first magnetic film 5, the second magnetic film 35 and the gap film 39, and supplied to the pole portion, to magnetically record for a magnetic disk by the magnetic flux for writing.

As mentioned above, since the second magnetic film 35 rises up from the Throat Height TH on the gap film 39 at the Apex Angle, the electromagnetic conversion properties of the thin film magnetic head can be adjusted appropriately by setting the Throat Height TH and the Apex Angle.

Since the coil film 37 is embedded in the insulating film 41, and the second magnetic film 35 is placed on the insulating film 41, the coil film 37 can be electrically insulated from the first and the second magnetic films 5 and 35. The inductive type electromagnetic conversion element 33 is entirely covered with the protection film 21.

The insulating film 41 is made of an organic insulating material, and the coil film 37 is embedded in the organic insulating film 41. Moreover, the protection film 21 to cover the whole of the element 33 is made of alumina or the like. Therefore, when a heat (Joule heat) is developed in the coil film 37, it can not be radiated outside effectively and thus, stored in the insulating film 41. In this case, the insulating film 41, and thus, the first and the second magnetic films 3 and 35 which are adjacent to the insulating film 41 are thermally expanded. Therefore, the pole portion, which is composed of the forefronts of the first and the second magnetic films 5 and 35 and not tightly fixed, is thermally expanded outside in the ABSs 75 and 76. As a result, the thin film magnetic head may be crashed, and thus, a magnetic disk and magnetically recorded data may be damaged, so the reliability of the magnetic disk driving device including the magnetic head may be degraded.

In order to resolve the problem, the thin film magnetic head of the present invention includes a thermal diffusion film 381, as shown in FIG. 2. The thermal diffusion film 381 is made of a metallic film, and disposed in the heat transmission path from the coil film 37 toward the slider 73.

The thin film magnetic head, as mentioned above, includes the inductive type electromagnetic conversion element 33 on the slider 73. Then, the inductive type electromagnetic conversion element 33 is covered with the protection film 21 made of alumina etc. Therefore, when a Joule heat is created in the coil film 37, originated from the electric current for writing it may be transmitted toward the protection film 21 and the slider 73 from the coil film 37, and thus, radiated outside. However, since the protection film 21 is formed thinner so that the maximum thickness is set to about 30 $\mu$m, the volume and thus, the thermal capacity of the protection film 21 is very small. As a result, the protection film 21 is thermally saturated at once by the Joule heat in the coil film 37, so the Joule heat can not be radiated effectively via the protection film 21.

On the contrary, the volume and thus, the thermal capacity of the slider 73 is much larger than those of the protection film 21, and thus, a sharp and large temperature gradient is created in between the coil film 37 and the slider 73.

In the present invention, much attention is paid to the large temperature gradient, and thus, the thermal diffusion film 381 is disposed in the heat transmission path from the coil film 37 toward the slider 73. In this case, the Joule heat in the coil film 37 can be transmitted to the slider 73, and radiated outside effectively via the slider 73 by taking advantage of the sharp and large thermal gradient.

As mentioned above, the thermal diffusion film 381 is made of a metallic film. In this case, since the thermal diffusion film 381 has a large thermal conductivity, the Joule heat created in the coil film 37 can be transmitted to the slider 73 and radiated outside effectively. Also, the thermal diffusion film 381 can be recognized from the nearby constituent elements made of an organic or an inorganic insulating material.

As mentioned above, according to the present invention, since the Joule heat created in the coil film 37, originated from the electrical current for writing, can be transmitted to the slider 73 via the thermal diffusion film 381 and radiated outside via the slider 73, the thermal expansion in the constituent elements such as the insulating film 41, the first and the second magnetic films 5 and 35 around the coil film 37 can be inhibited effectively. Therefore, even though the floating space is narrowed to 40 nm, 30 nm, or 20 nm, the thin film magnetic head can not be crashed, and thus, a magnetic disk and magnetically recorded date can not be damaged.

Figure 5:
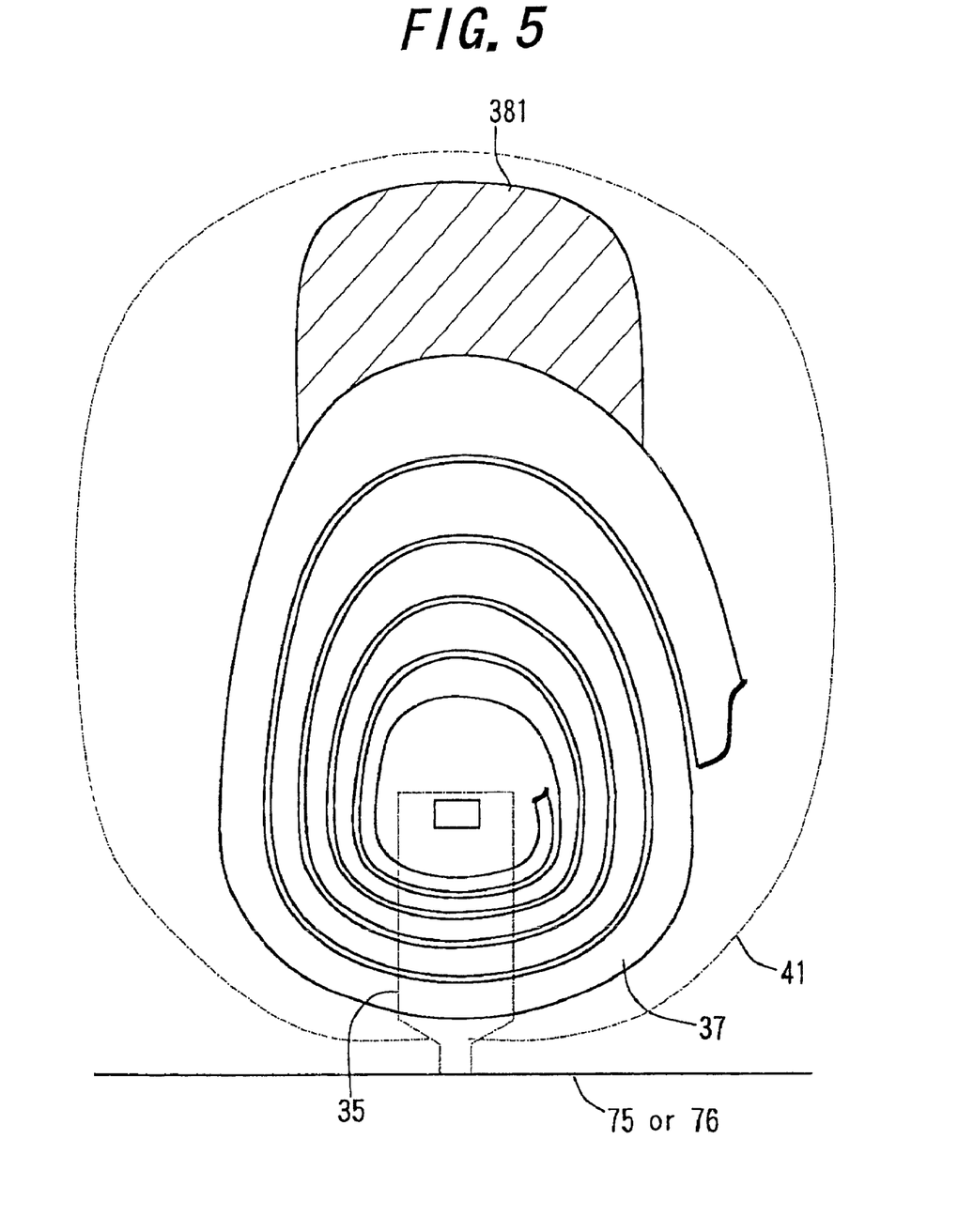
FIG. 5 is an embodiment in the thermal diffusion film of the thin film magnetic head shown in FIG. 1.

FIG. 5 is a first embodiment of the thermal diffusion film 381. In this case, the thermal diffusion film 381 is continued from the coil film 37, and expanded outside. The Joule heat created in the coil film 37 is directly transmitted to the thermal diffusion film 381 at the same surface level. In the coil film 37, the constructional properties such as the line width, the pitch, and the winding number are strictly restricted, but in the thermal diffusion film 381, such constructional properties are not strictly restricted. Therefore, the area of the thermal diffusion film 381 can be enlarged within a physically allowable range. As a result, the thermal diffusion film 381 can have a large heat capacity, and thus, absorb the Joule heat in the coil film 37 effectively. Moreover, since a sharp and large thermal gradient is created in between the coil film 37 and the slider 73, the absorbed heat can be thermally transmitted to the slider 73 effectively.

In this embodiment, since the thermal diffusion film 381 is continued to the coil film 37, it may be made of the same material as the one of the coil film 37 at the same time when the coil film 37 is patterned.

Figure 6:
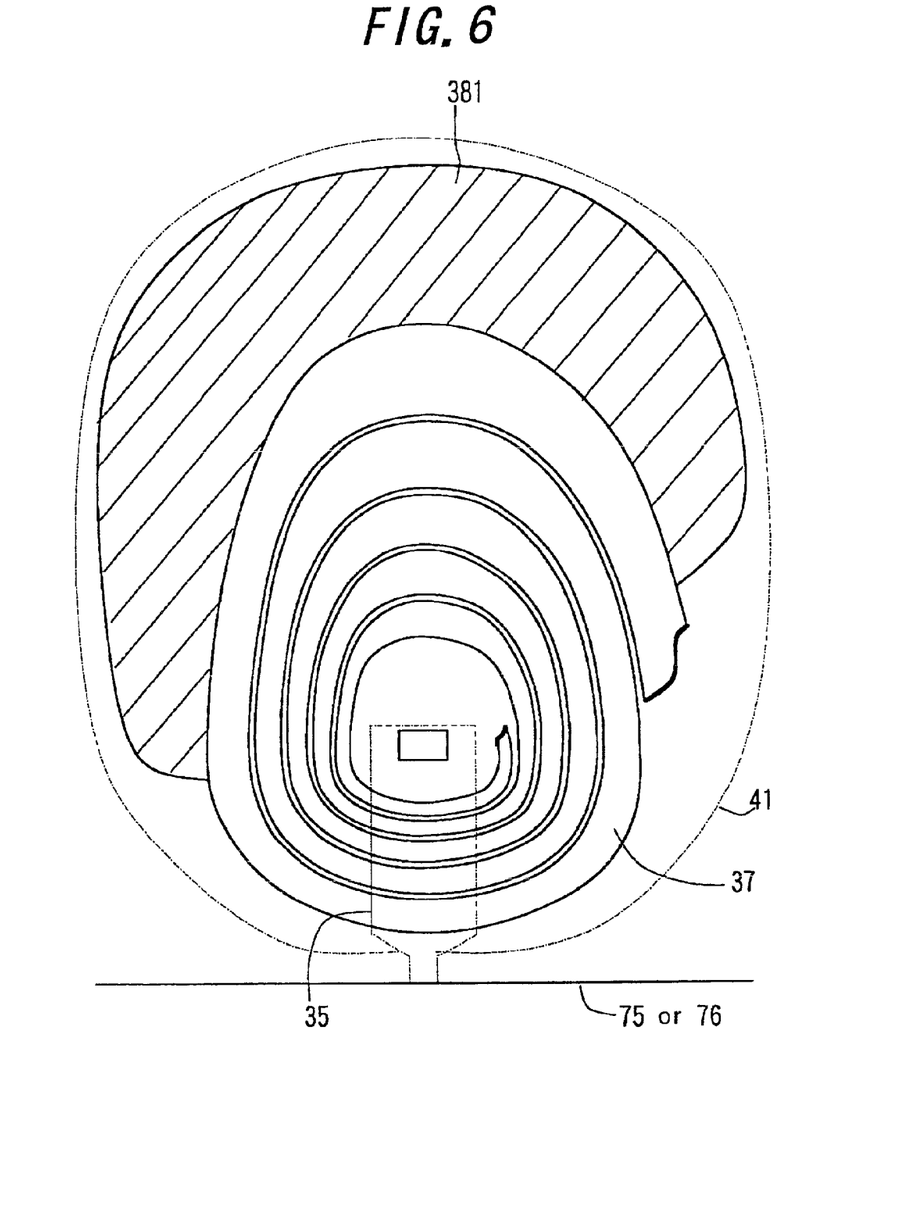
FIG. 6 is another embodiment in the thermal diffusion film of the thin film magnetic head shown in FIG. 1.

The size and the shape of the thermal diffusion film 381 is not restricted. For example, the thermal diffusion film 381 may be made shorter or longer along the periphery of the coil film 37 as shown in FIG. 5 or FIG. 6.

If a multi-layered coil film is employed, instead of the coil film 37, thermal diffusion films may be made for of the respective coil films of the multi-layered coil film or only a thermal diffusion film may be made for a first layered coil film thereof nearest to the slider 73.

Figure 7:
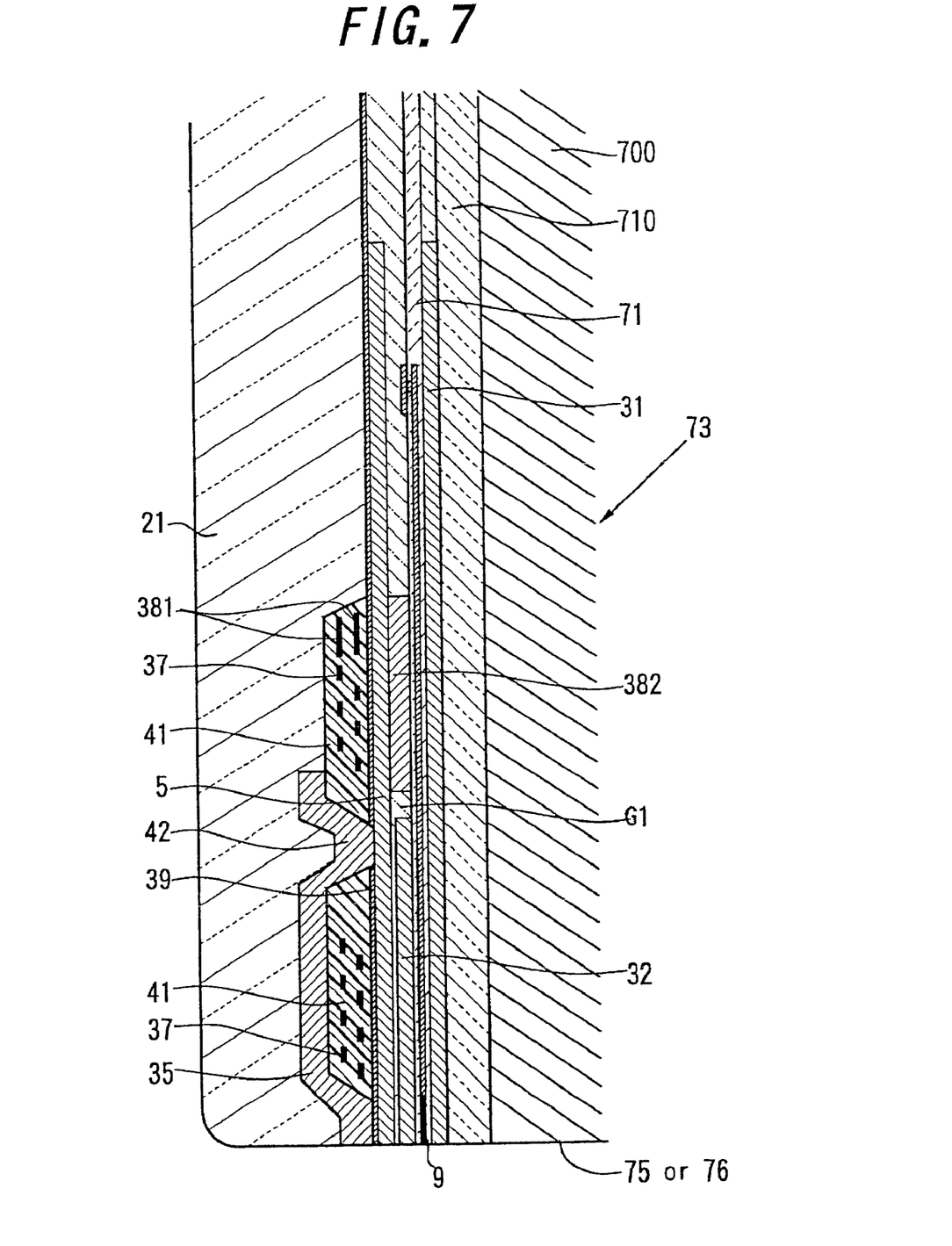
FIG. 7 is a cross sectional view showing another thin film magnetic film according to the present invention.
Figure 8:
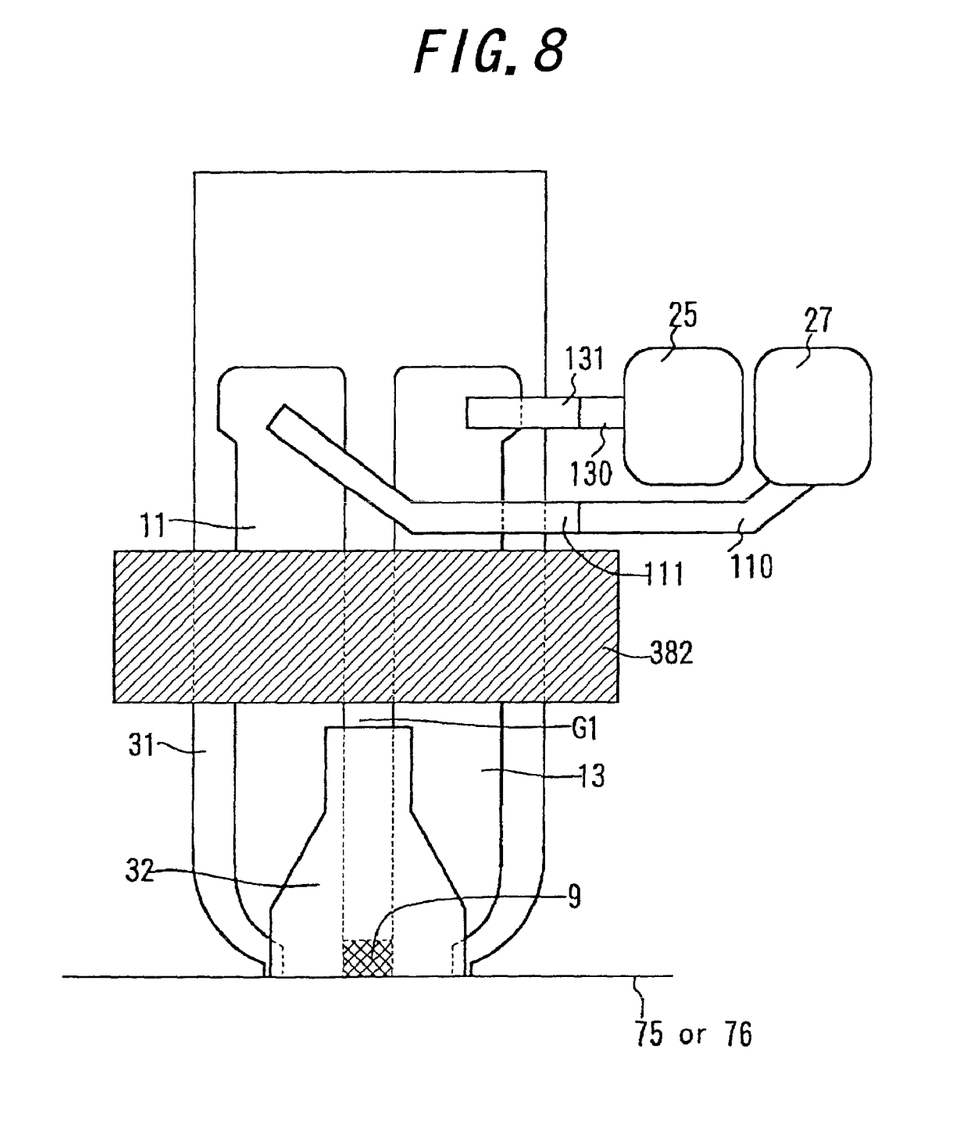
FIG. 8 is a plan view showing the MR element of the thin film magnetic head shown in FIG. 7.

FIG. 7 is a cross sectional view showing another thin film magnetic film according to the present invention, and FIG. 8 is a plan view showing the MR element of the thin film magnetic head shown in FIG. 7. In these figure, the same reference numerals are given to the same constituent elements as in FIGS. 1–6. In this embodiment, a thermal diffusion film 382 is disposed in between the first magnetic film 5 and the slider 73 in the inductive type electromagnetic conversion element 33. In this case, the thermal diffusion film 37 having a large thermal conductivity is disposed in the heat transmission path from the coil film 37 toward the slider 73 which has a sharp temperature gradient, so the Joule heat created in the coil film 37 can be transmitted to the slider 73 effectively.

The size and the shape of the thermal diffusion film 382 can not be restricted. In this embodiment, as shown in FIG. 8, the thermal diffusion film 382 is extended beyond the first shielding film 31 in the width direction.

The thermal diffusion film 382 is made of a metallic film having a large thermal conductivity. For example, the thermal diffusion film 382 may be made of the same magnetic material as the one of the first shielding film 31, the first magnetic film 5 or the second magnetic film 35, or may be of a non magnetic material. If the thermal diffusion film 382 is made of a magnetic material, it is desired that a magnetic gap G1 is provided in between the thermal diffusion film 382 and the second shielding film 32. In this case, the intensity of the magnetic flux for writing through the thermal diffusion film 382 and the second shielding film 32 can be reduced, and thus, the reading operation by the MR element 9 can be stabilized.

In this embodiment, the thermal diffusion film (first thermal diffusion film) 381 is also encompassed, in addition to the thermal diffusion film 382 (second thermal diffusion film). As mentioned above, the thermal diffusion film 381 is continued from the coil film 37, and expanded outside. Then, as mentioned above, the thermal diffusion film 382 is disposed in between the first magnetic film 5 and the slider 73. Therefore, the Joule heat created in the coil film 37 can be radiated more effectively, and thus, the thermal expansion in the constituent elements such as the insulating film 41, the first and the second magnetic films 5 and 35 around the coil film 37 can be inhibited more effectively. As a result, the head crash can be inhibited absolutely, and a magnetic disk and magnetically recorded date are not almost damaged.

Figure 9:
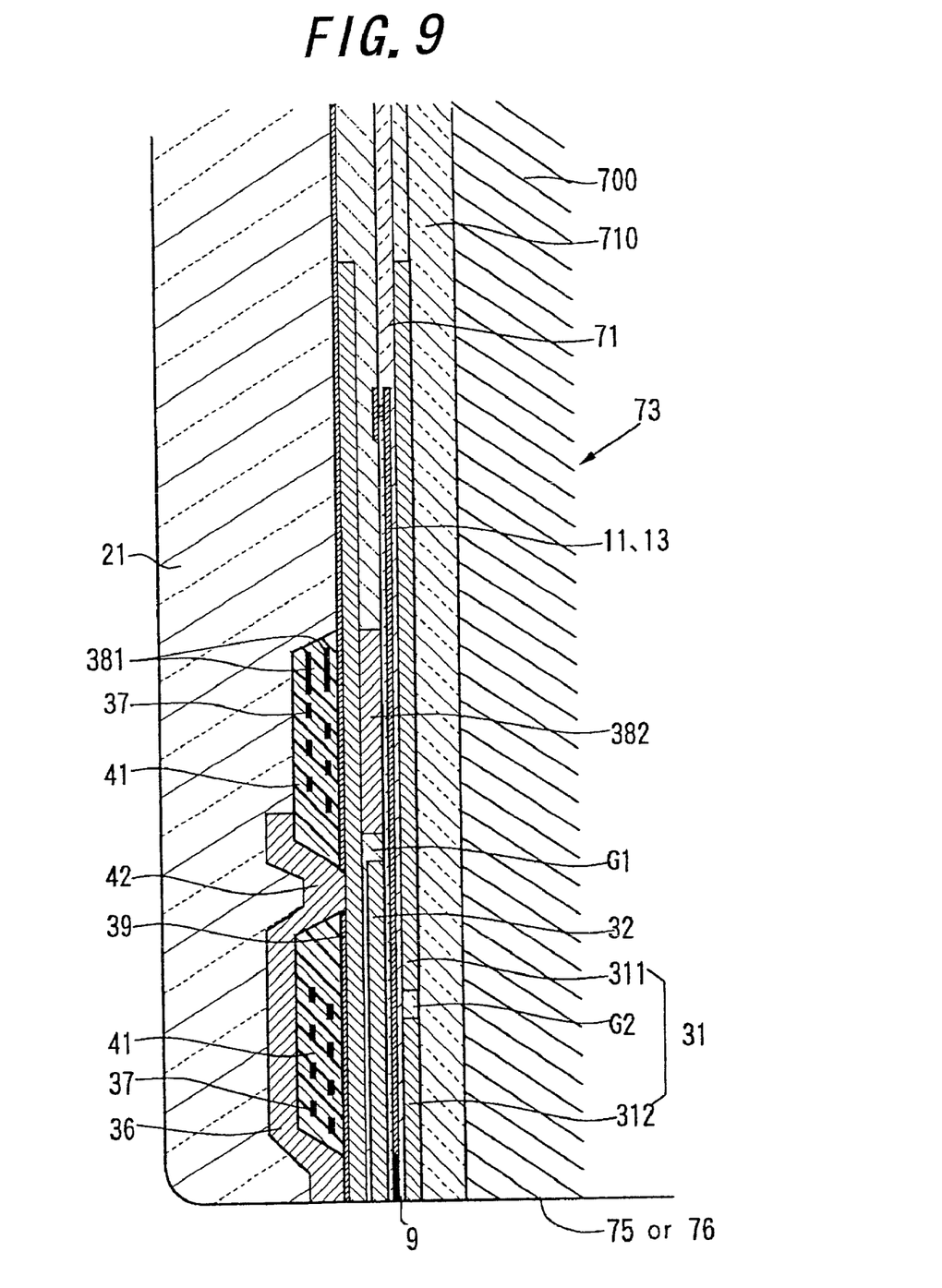
FIG. 9 is a cross sectional view showing still another thin film magnetic head according to the present invention.
Figure 10:
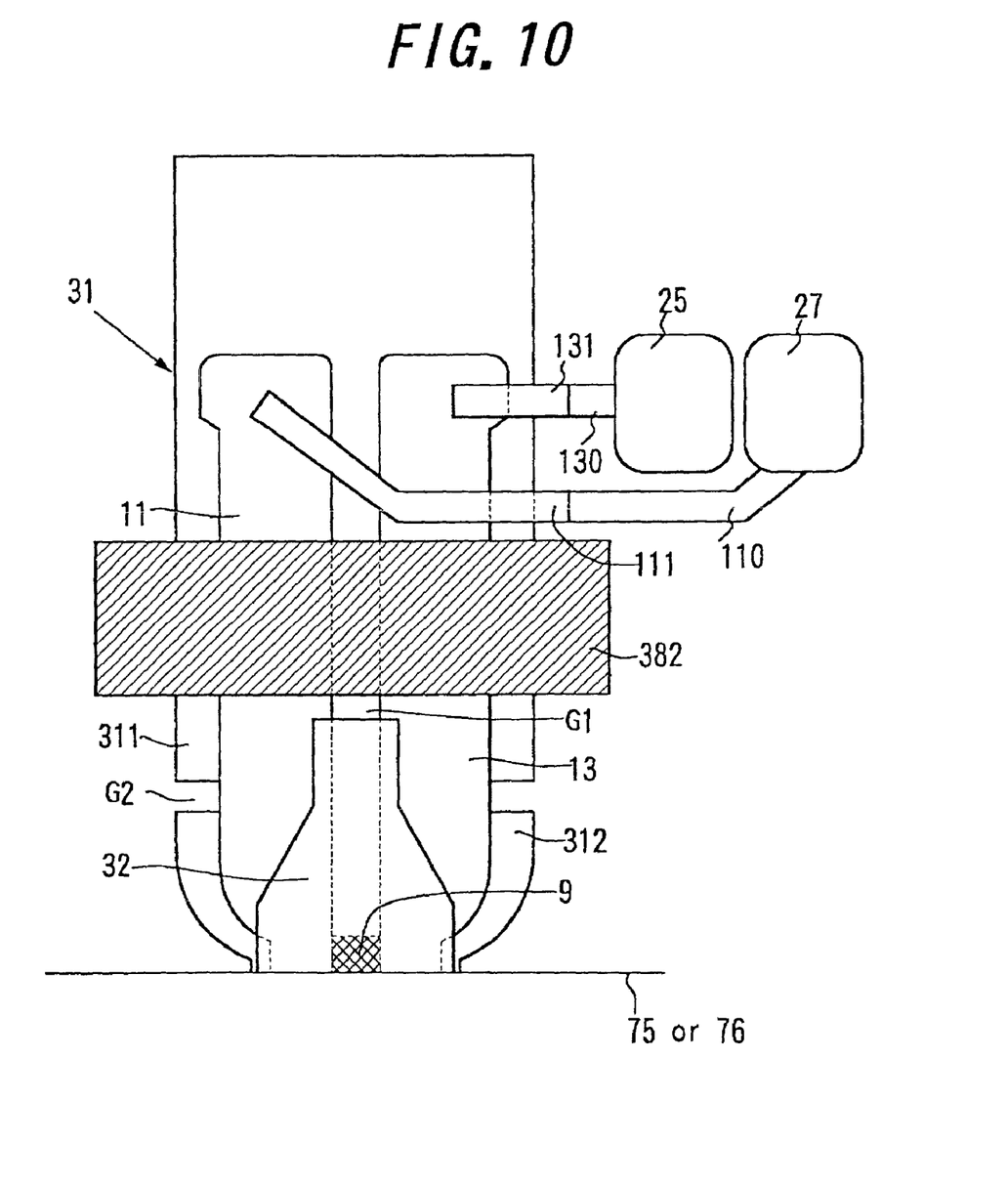
FIG. 10 is a plan view showing an embodiment in the MR element of the thin film magnetic head shown in FIG. 9.
Figure 11:
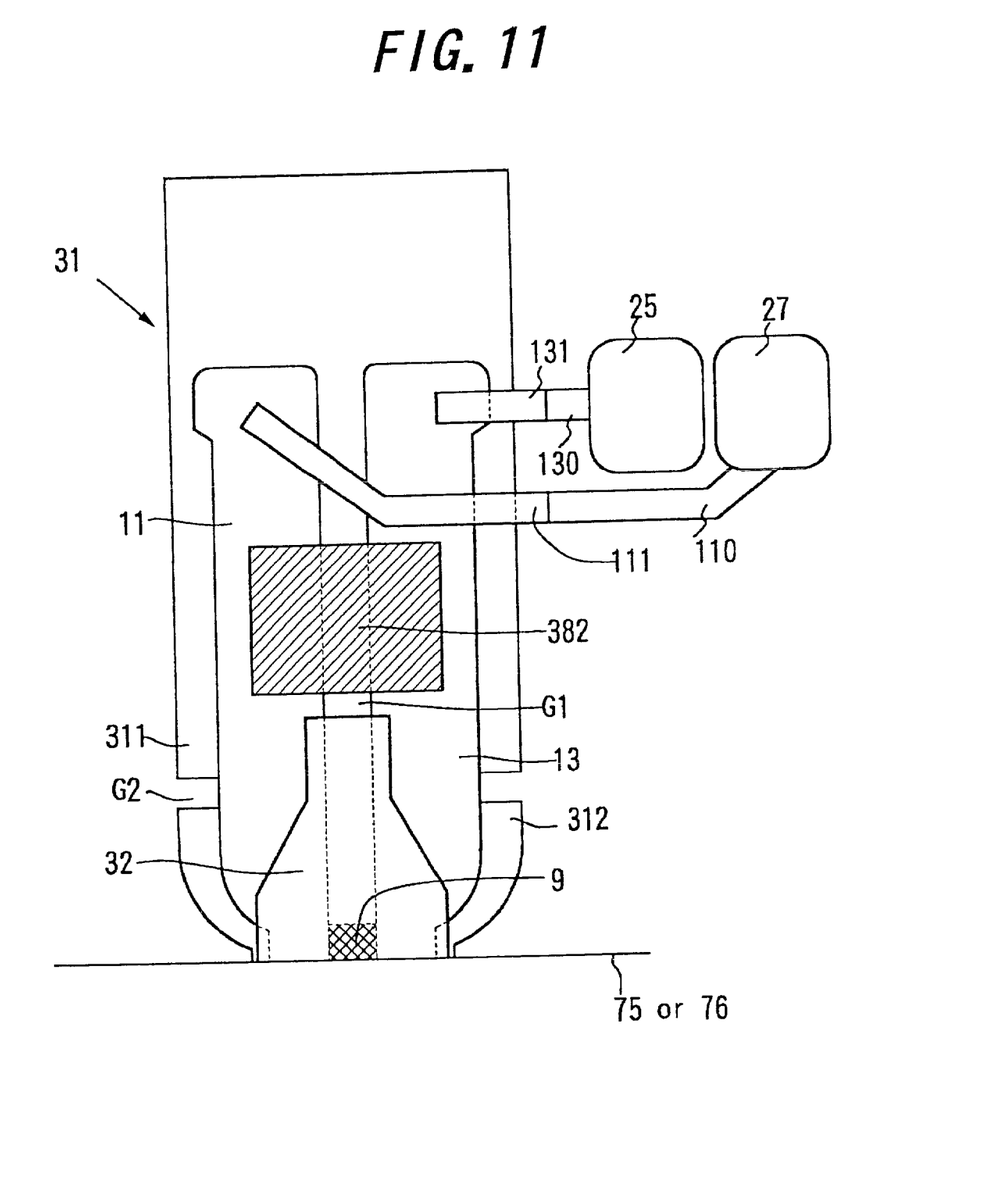
FIG. 11 is a plan view showing another embodiment in the MR element of the thin film magnetic head shown in FIG. 9.

FIG. 9 is a cross sectional view showing still another thin film magnetic head according to the present invention, and FIG. 10 is a plan view showing an embodiment in the MR element of the thin film magnetic head shown in FIG. 9. FIG. 11 is a plan view showing another embodiment in the MR element of the thin film magnetic head shown in FIG. 9. In these figure, the same reference numerals are given to the same constituent elements as in FIGS. 1 8. In this embodiment, the thermal diffusion film 382 is made of a magnetic material, and the magnetic gap G1 is provided in between the thermal diffusion film 382 and the second shielding film 32, as mentioned above. Moreover, the first shielding film 31 is divided into two shielding films 311 and 312, and a gap G2 is provided between the shielding films 311 and 312. In this case, the intensity of the magnetic flux for writing through the thermal diffusion film 382 and the first shielding film 31 can be also reduced. As a result, the reading operation by the MR element 9 can be much stabilized, originated from the reduction in the intensities of the magnetic flux for writing through the thermal diffusion film 382 and the second shielding film 32 and through the thermal diffusion film 382 and the first shielding film 31.

The size and the shape of the thermal diffusion film 382 can not be restricted. For example, as shown in FIG. 10, the thermal diffusion film 382 may be extended beyond the divided shielding film 311 constituting the first shielding film 31 in the width direction. Moreover, as shown in FIG. 11, the thermal diffusion film 382 may be narrowed within the divided shielding film 311 in the width direction.

Figure 12:
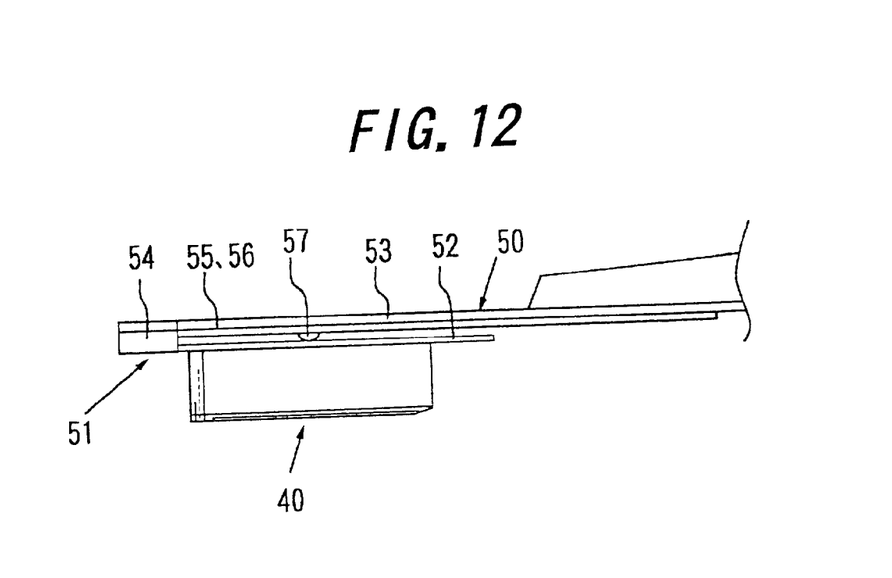
FIG. 12 is an elevational view showing a part of a magnetic head device according to the present invention.
Figure 13:
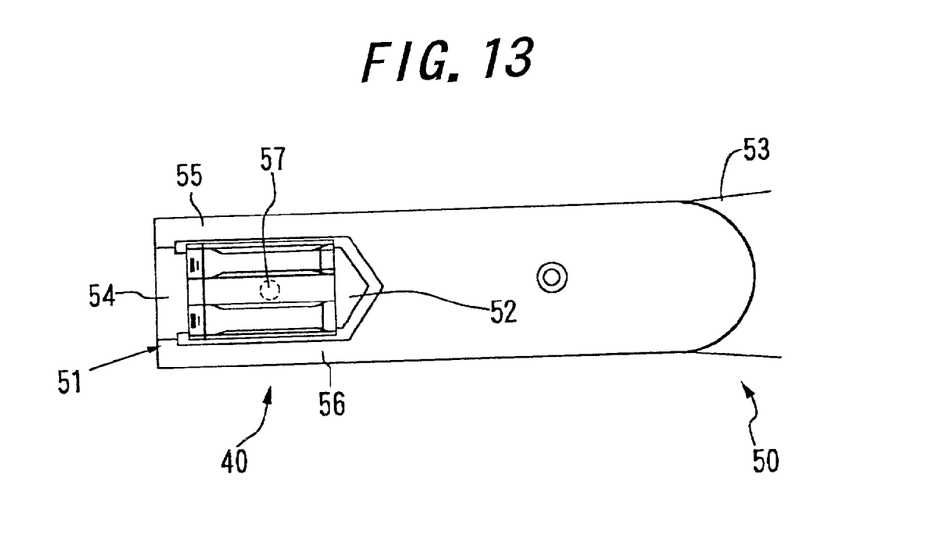
FIG. 13 is a bottom plan view of the magnetic head device shown in FIG. 12.

FIG. 12 is an elevational view showing a part of a magnetic head device according to the present invention, and FIG. 13 is a bottom plan view of the magnetic head device shown in FIG. 12. The magnetic head device includes a head supporting apparatus 50 and a thin film magnetic head 40 as shown in FIGS. 1–11.

The head supporting apparatus 50 is composed of a supporter 53 made of a metallic plate and a flexibler 51 made of a metallic plate provided on the free edge of the supporter 53 in its longitudinal direction. The thin film magnetic head 40 is attached on the lower surface of the flexibler 51.

The flexibler 51 has two outerframes 55 and 56 substantially parallel to the supporter 53 in its longitudinal direction, a lateral frame 54 to join the outerframes 55 and 56 in the remote portion thereof from the supporter 53, and a tongue shaped member 52, of which the forefront is free, extending substantially parallel to the outerframes 55 and 56 from the almost central portion of the lateral frame 54.

On the almost central portion of the tongue shaped member 52 is provided a hemispheric loading convex portion 57 bulging on the supporter 53. The loading convex portion 57 conducts a load to the tongue shaped member 52 from the free edge of the supporter 53.

The thin film magnetic head 40 is attached to the lower surface of the tongue shaped member 52 by an adhesive agent, etc. Moreover, the thin film magnetic head 40 is so provided that its air outflow side can correspond to the longitudinal direction of the lateral frame 54. In this invention, any kind of head supporting apparatus may be employed, besides the above head supporting apparatus 50.

Figure 14:
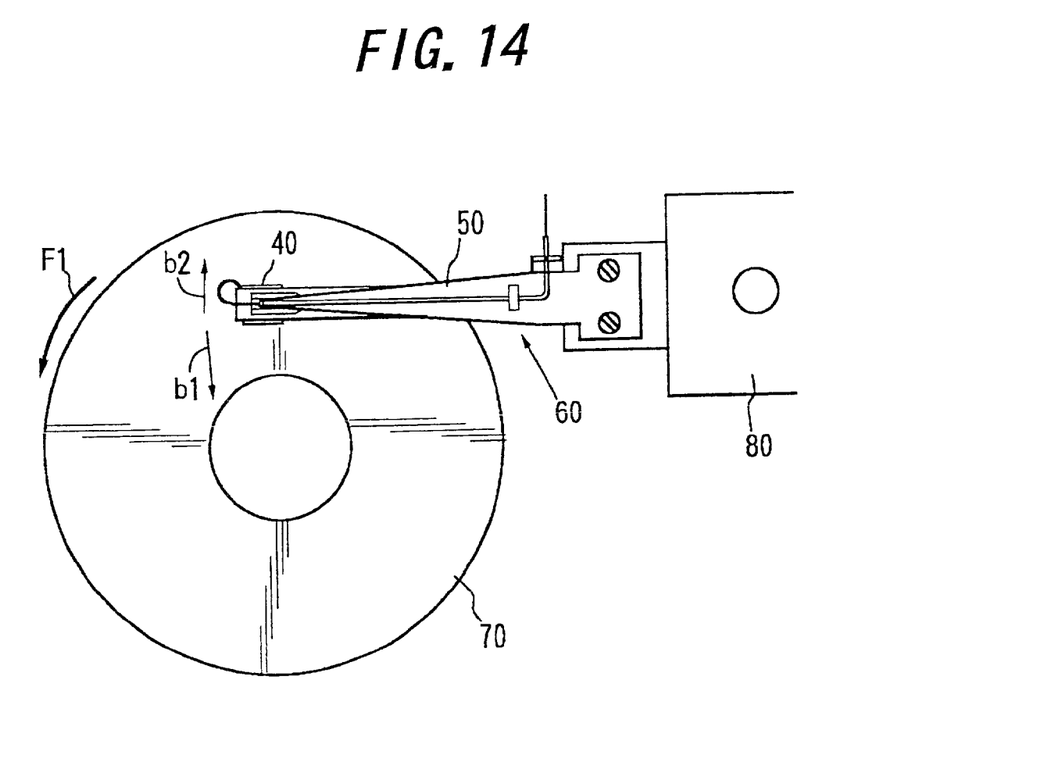
FIG. 14 is a plan view a magnetic recording/reproducing driving device according to the present invention.

FIG. 14 is a plan view showing a magnetic disk driving device according to the present invention. The magnetic disk driving device includes a magnetic head device 60 as shown in FIGS. 12 and 13 and a magnetic disk 70. The magnetic head device 60 is mounted on a position determining device 80 by supporting the one end of the head supporting apparatus 50, and then, driven by the device 8. The thin film magnetic head 40 of the magnetic head device 60 is supported by the head supporting apparatus 50, and is positioned so as to oppose the magnetic recording surface of the magnetic disk 70.

When the magnetic disk 70 is rotated in the F1 arrow direction by not shown driving device, the thin film magnetic head 40 floats on the magnetic disk 70 by a minute space. A rotary actuator system is generally employed as the driving system, but a linear actuator system may be done. In FIG. 14, the rotary actuator system is employed, and the thin film magnetic head 40 attached on the forefront of the head supporting apparatus 50 is moved in the radial direction b1 or b2 of the magnetic disk 70. Then, the thin film magnetic head 40 is positioned at a given track of the magnetic disk 70 by the position determining device 80 which rotates the head supporting apparatus 50.

Although the present invention was described in detail with reference to the above examples, this invention is not limited to the above disclosure and every kind of variation and modification may be made without departing from the scope of the present invention.

As mentioned above, a thin film magnetic head can be provided in which the thermal expansion in the ABS due to the developed heat at a recording operation can be repressed, and thus, the head crash and the damage for a magnetic disk and magnetically recorded data can be inhibited.

What is claimed is:

1. A thin film magnetic head comprising a slider, at least one inductive type electromagnetic conversion element and a thermal diffusion film,
    the inductive type electromagnetic conversion element including a first magnetic film, a second magnetic film, a gap film, a coil film and an insulating film which are supported by the slider,
    the forefronts of the first and the second magnetic films being opposed via the gap film in the air bearing surface side of the slider, and thereby, constituting a pole portion
    the first magnetic film being extended backward from the pole portion on the basis of the air bearing surface,
    the second magnetic film being extended backward from the pole portion with keeping a given space for the first magnetic film, and being joined with the first magnetic film at a backward joining portion,
    the coil film being embedded in the insulating film, and being wound spirally around the backward joined portion,
    the thermal diffusion film being made of a metallic film, continued and expanded outside from the coil film, and disposed in the heat transmission path from the coil film toward the slider, which corresponds to a shortest path between the coil film and the slider, so as to radiate Joule heat created in the coil film via the slider.

2. A thin film magnetic head as defined in claim 1, wherein the thermal diffusion film is so formed as to be integrated with the coil film.

3. A thin film magnetic head as defined in claim 2, wherein said coil film is formed in a double layer, and said thermal diffusion film is so formed as to be integrated with each layer of said coil film.

4. A thin film magnetic head as defined in claim 1, wherein the first magnetic film is provided nearer the slider than the second magnetic film, and the thermal diffusion film is disposed in between the first magnetic film and the slider.

5. A thin film magnetic head as defined in claim 4, wherein a surface of the thermal diffusion film is contacted with the surface opposing to the slider of the first magnetic film.

6. A thin film magnetic head as defined in claim 1, wherein the thermal diffusion film includes a first thermal diffusion film and a second thermal diffusion film,
    the first thermal diffusion film being continued from the coil film, and expanded outside from the coil film,
    the second thermal diffusion film being disposed in between the first magnetic film and the slider.

7. A thin film magnetic head as defined in claim 6, wherein the first thermal diffusion film is so formed as to be integrated with the coil film.

8. A thin film magnetic head as defined in claim 6, wherein the first magnetic film is provided nearer the slider than the second magnetic film, and the second thermal diffusion film is disposed in between the first magnetic film and the slider.

9. A thin film magnetic head as defined in claim 8, wherein a surface of the second thermal diffusion film is contacted with the surface opposing to the slider of the first magnetic film.

10. A thin film magnetic head as defined in claim 1, further comprising at least one magneto resistive effective element for reading.

11. A thin film magnetic head as defined in claim 10, wherein the magnetoresistive effective element includes a spin valve film structure.

12. A thin film magnetic head as defined in claim 10, wherein the magnetoresistive effective element is constructed of a ferromagnetic tunnel junction effective element.

13. A thin film magnetic head as defined in claim 10, wherein the magnetoresistive effective element is constructed of a giant magnetoresistive effective element with a perovskite type magnetic substance.

14. A thin film magnetic head as defined in claim 10, further comprising a first shielding film and a second shielding film, wherein the magnetoresistive effective element is disposed in between the first shielding film and the second shielding film, and the first shielding film is provided nearer the slider than the second shielding film, and the second shielding film is provided nearer the slider than the first magnetic film.

15. A magnetic head device comprising a thin film magnetic head as defined in claim 1 and a head supporting apparatus to support the thin film magnetic head.

16. A magnetic disk driving device comprising a magnetic head device as defined in claim 15 and a magnetic disk which is magnetically recorded and reproduced by the magnetic head device.

* * * * *